United States Patent [19]

Gilden

[11] 3,907,151

[45] Sept. 23, 1975

[54] INSULATION RETAINING PLATES FOR PRESSURE VESSELS

[75] Inventor: John Richard Gilden, Knutsford, England

[73] Assignee: The Nuclear Power Group Limited, Cheshire, England

[22] Filed: Dec. 11, 1972

[21] Appl. No.: 313,880

[30] Foreign Application Priority Data
Dec. 10, 1971  United Kingdom............. 57553/71

[52] U.S. Cl..................... 220/63 R; 52/573; 176/87
[51] Int. Cl........................ B65d 87/34; B65d 13/04
[58] Field of Search........... 220/9 R, 9 A, 9 LG, 10, 220/15, 63 R, 3, 5 A; 52/573; 176/87

[56] References Cited
UNITED STATES PATENTS

| | | | |
|---|---|---|---|
| 2,853,871 | 9/1958 | Compton | 52/573 |
| 3,511,003 | 5/1970 | Alleaune | 220/9 A |
| 3,581,450 | 6/1971 | Patry | 52/573 |
| 3,595,728 | 7/1971 | Robson | 176/87 |
| 3,636,674 | 1/1972 | Cremer | 176/87 |
| 3,648,879 | 3/1972 | Jackson | 52/573 |

FOREIGN PATENTS OR APPLICATIONS

| | | | |
|---|---|---|---|
| 1,462,337 | 11/1966 | France | 176/87 |
| 591,672 | 4/1959 | Italy | 176/87 |
| 237,627 | 2/1962 | Australia | 52/573 |

*Primary Examiner*—William I. Price
*Assistant Examiner*—Stephen Marcus
*Attorney, Agent, or Firm*—Holman & Stern

[57] ABSTRACT

A pressure vessel such as for a nuclear reactor which is provided with a thermal insulation lining retained by a plurality of cover plates, the cover plates being connected to the wall of the pressure vessel and adjacent plates being interconnected by a spring member which is designed and arranged so as to provide resilient flexibility in the plane of the cover plate but relative stiffness in the other orthogonal planes.

6 Claims, 4 Drawing Figures

US Patent  Sept. 23,1975  3,907,151

INSULATION RETAINING PLATES FOR PRESSURE VESSELS

This invention relates to pressure vessels having a thermal insulation lining retained by cover plates, and is particularly, although not exclusively, applicable to pressure vessels for housing the primary circuit components of a nuclear reactor.

The wall of a pressure vessel which is required to contain a hot fluid may be maintained at a lower and safer working temperature by providing cooling means on the external surface of the wall and restricting the heat flow to the internal surface of the wall by lining the internal surface with a layer of insulating material. Various insulating material may be used such as for example a fibrous mat made of ceramic or mineral wool or metal foils spaced by wire mesh or combinations of these. The insulating material may be covered on the inner surface by one or more foils to prevent the egression of fibres or other particulate matter into the fluid contained in the vessel and the assembled insulation is retained firmly in place by means of stiff cover plates which are attached to the wall of the vessel by means to be described. The fixing means must be such that movement of the individual cover plates principally in the plane parallel to the wall surface is relatively unrestrained and in some nuclear reactor installations may also be required to withstand an environment subjected to noise levels which unless appropriate design measures are taken, may cause structural damage.

The object of the invention is to provide a flexible means of connecting together a number of such insulation retaining plates in order to permit movement of the plates due to thermal and pressure changes in the vessel in a prescribed manner.

A further object of the invention is to provide two or more independent fixing means for attaching each cover plate to the inner wall of the pressure vessel so that if one fixing means fails the cover plate will still be adequately secured in position.

The present invention consists in a pressure vessel which is provided with a thermal insulation lining retained by a plurality of in insulation cover plates, the cover plates being connected to the wall of the pressure vessel and adjacent cover plates being interconnected by a spring member which is designed and arranged so as to provide resilient flexibility in the plane of the cover plate but relative stiffness in the other orthogonal planes.

The cover plates may be of polygonal shape and the resilient spring member may be fixed between adjacent margins of adjacent plates. Alternatively the resilient spring member may be fixed between adjacent corners of adjacent plates.

The resilient spring member may take many forms. In one embodiment it takes the form of one or more open ended 'U' shaped springs. In a further embodiment the spring member takes the form of one or more closed loops.

In a preferred embodiment the invention is applicable to the pressure vessel of a gas-cooled reactor in which a thermal insulating layer is retained within the pressure vessel by a plurality of retaining cover plates having primary attachment studs retaining the cover plates to the pressure vessel wall, the resilient spring members providing secondary attachment means between adjacent insulation cover plates.

The invention will now be described in greater detail by way of example only, with reference to the accompanying drawings, in which.

Figures 1, 2, 3, 4:
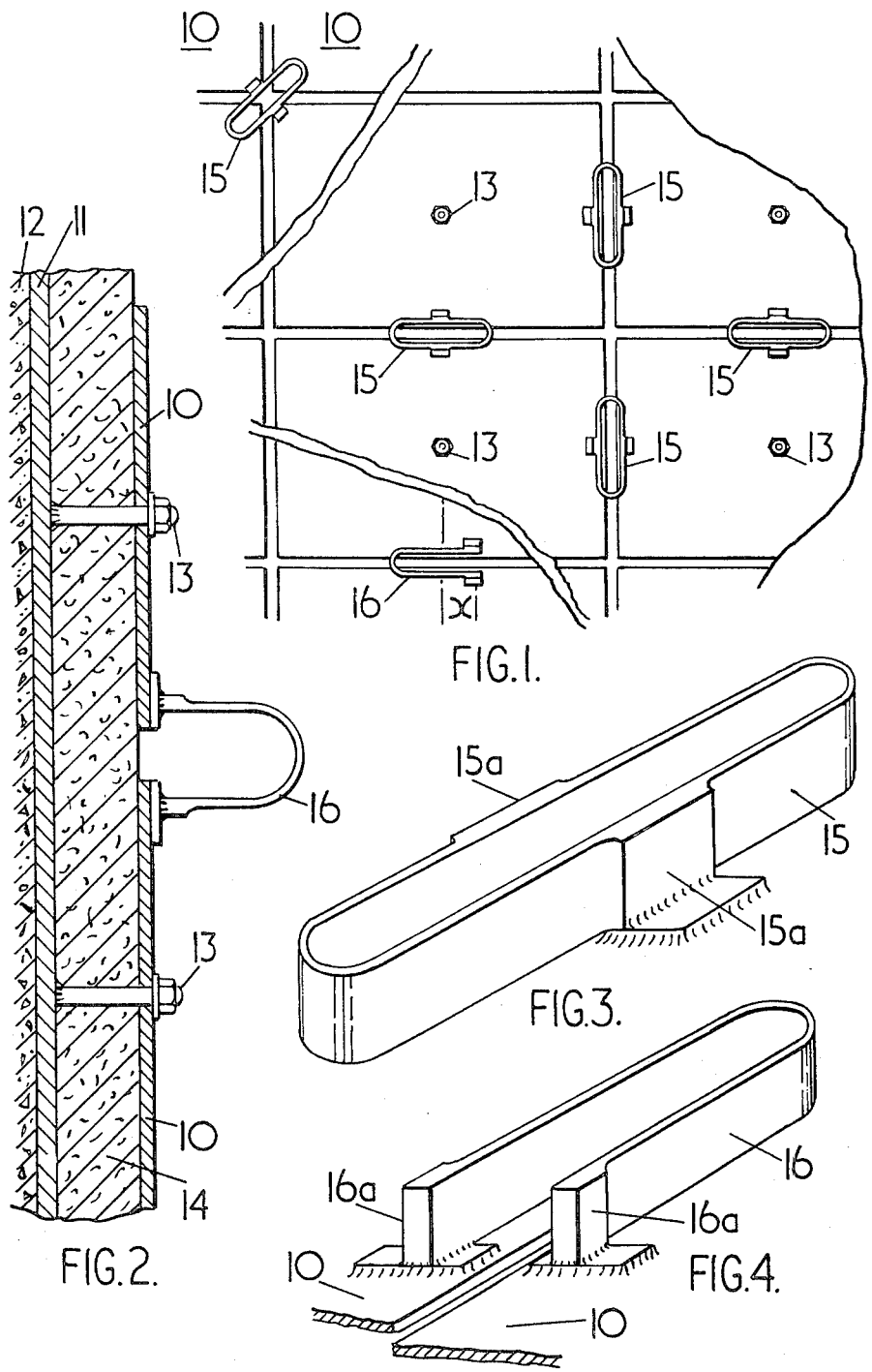
FIG. 1 is an elevation of part of an insulation retaining cover plate arrangement in accordance with the invention for a gas-cooled reactor pressure vessel.
FIG. 2 is a sectional elevation through one wall of the pressure vessel.
FIG. 3 is an enlarged view showing in greater detail an example of one of the resilient spring members shown in FIG. 1.
FIG. 4 is an enlarged view showing in greater detail an alternative example of one of the resilient spring members shown in FIG. 1.

FIGS. 1 and 2 show a number of rectangular insulation cover plates 10 which are fixed to the internal wall of a steel liner 11 of a concrete pressure vessel 12 by means of primary fixing studs 13. The thermal insulating medium 14, which may be of fibrous material, such as ceramic fibre, mineral wool or other similar material, is formed in layers between metal foils in a known manner and is retained between the steel liner 11 and the metal cover plates 10. It will be understood that FIG. 1 shows only a part of the overall internal wall of a pressure vessel.

As shown in FIG. 1, a number of resilient spring members, 15 and 16 are shown attached to adjacent cover plates 10. Resilient spring member 15 is illustrated in greater detail in FIG. 3 and consists of a flat metal strip of rectangular cross-section in the form of a closed elongated loop. Adjacent plates 10 are joined by means of the spring member 15 by tongue portions 15a welded to the longitudinal sides of spring member 15 and adjacent margins of plates 10. As shown in FIG. 1, spring members 15 are fixed between adjacent margins of plates 10 in line with primary fixing studs 13. Alternatively as shown at the extreme top left of FIG. 1 the resilient spring member 15 may be welded to adjacent corners of cover plates 10.

The form of the resilient spring member 16 is shown in FIG. 4, and as in spring 15 is formed of rectangular cross-section metal. In this form, however, the spring member 16 is of an open-ended 'U' shape, having thickened end portions 16a. Spring 16 is welded to adjacent plates 10 in a position offset from the primary fixing studs 13, the distance of offset $x$ being so related to the spring resilience to produce a coupling moment between the two plates which is equal and opposite to that induced by the encastre attachment of the spring member to the cover plate.

An alternative method of connecting resilient spring member 16 is shown in FIG. 2. In this case the axis of the 'U' shape is normal to plates 10 instead of being parallel.

The resilient spring members 15 and 16 are designed and arranged to have flexibility in the plane of the cover plates 10 such that the thermal expansion of the plates 10 can be accommodated without inducing significant loads in the primary fixings 13, even in the event of an unbalanced system occurring. The spring members 15 and 16 may be attached or welded or bolted after the cover plates 10 are installed in their nominal positions. The spring members are sufficiently stiff in the plane normal to the surface to hold the plates securely in contact with the insulation material 14 and are stiff also in the direction normal to the lines passing through the points of attachment in the plane of the cover plates. The springs may be positioned coplanar with or just above the cover plates.

It will be evident that alternative forms of resilient spring members may be used and that the resilient spring members may form the primary attachment means between the insulation cover plates, with only a limited number of the cover plates being secured to the pressure vessel liner at suitable points.

Although the pressure vessel has been described in relation to a gas-cooled nuclear reactor, it will be evident that it may be used in water or sodium cooled reactors or for other purposes.

I claim:

1. A pressure vessel for a nuclear reactor wherein there is provided an inner lining of a thermal insulation medium, the lining being retained on the inner walls of the pressure vessel by a plurality of separate metal cover plates which are held to the wall of the pressure vessel by means of studs, wherein adjacent plates are interconnected by two or more separated spring members being so connected to adjacent cover plates as to provide resilient flexibility only in the plane of the cover plate and stiffness in the other orthogonal planes.

2. A pressure vessel as claimed in claim 1, wherein the spring members are connected between adjacent margins of adjacent cover plates.

3. A pressure vessel as claimed in claim 1, wherein the spring members are connected between adjacent corners of adjacent cover plates.

4. A pressure vessel as claimed in claim 1, wherein at least some of the spring members consist of a flat metal strip arranged in the form of an open ended U shape.

5. A pressure vessel as claimed in claim 1, wherein at least some of the spring members consists of a flat metal strip arranged in the form of a closed elongated loop.

6. A pressure vessel as claimed in claim 5, wherein the loop is in a plane parallel to a plane containing the cover plates.

* * * * *